J. R. SNYDER.
FEED VALVE FOR AIR BRAKE SYSTEMS.
APPLICATION FILED JUNE 24, 1912.

1,085,763.

Patented Feb. 3, 1914.

WITNESSES

INVENTOR
Jacob Rush Snyder
By Fredk. W. White
Attorney

UNITED STATES PATENT OFFICE.

JACOB RUSH SNYDER, OF PITTSBURGH, PENNSYLVANIA, ASSIGNOR TO PERCY E. DONNER, OF PITTSBURGH, PENNSYLVANIA.

FEED-VALVE FOR AIR-BRAKE SYSTEMS.

1,085,763.  Specification of Letters Patent.  Patented Feb. 3, 1914.

Application filed June 24, 1912.  Serial No. 705,565.

*To all whom it may concern:*

Be it known that I, JACOB RUSH SNYDER, a resident of Pittsburgh, in the county of Allegheny and State of Pennsylvania, have invented a new and useful Improvement in Feed-Valves for Air-Brake Systems, of which the following is a specification.

This invention relates to what are known as feed valves for air brake systems, that is, valves for supplying the train or brake pipe with a definite pressure from the main reservoir or other source which may fluctuate more or less, and which generally is much higher than the pressure desired to be carried in the train pipe.

The object of the invention is to provide a feed valve for air brake systems which is of simple construction, not liable to derangement, and whereby the pressure to be carried by the train pipe can be readily controlled by the engineer.

The invention comprises a valve constructed and arranged as hereinafter described and claimed.

Figure 2:
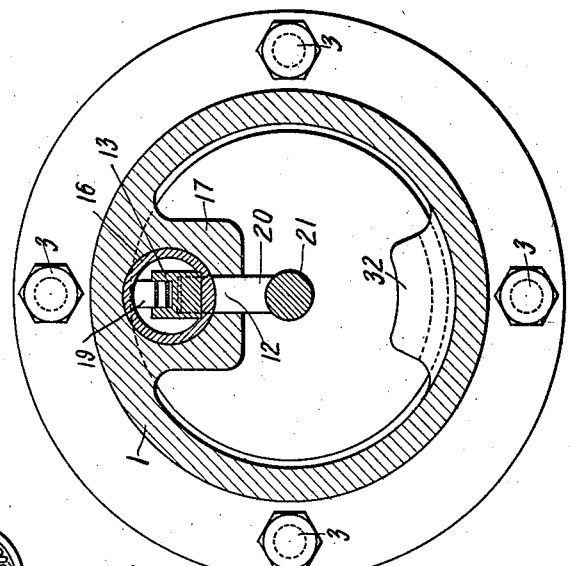
Figure 1:
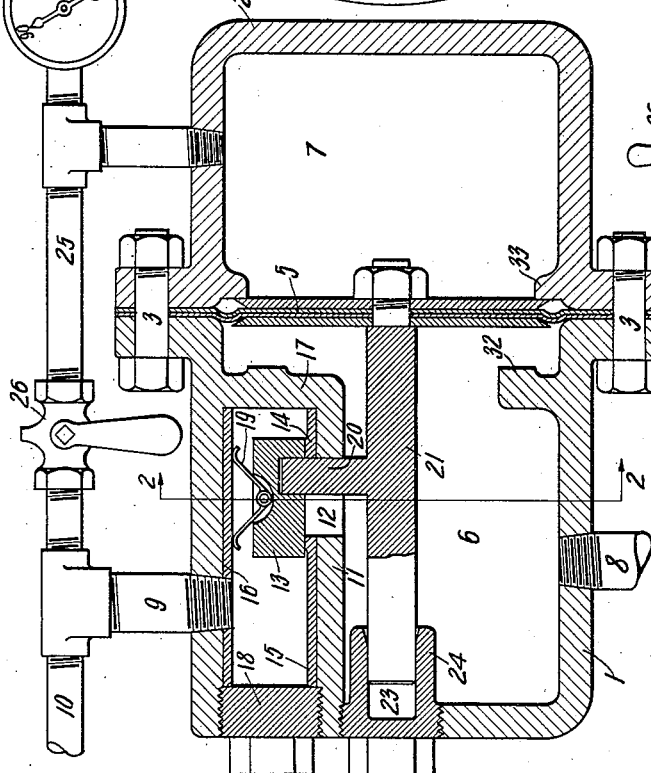

In the accompanying drawings Figure 1 is a longitudinal section through one form of valve embodying the invention; Fig. 2 is a transverse section on the line 2—2, Fig. 1; and Fig. 3 is a longitudinal section through another form of valve embodying the invention.

Figure 3:
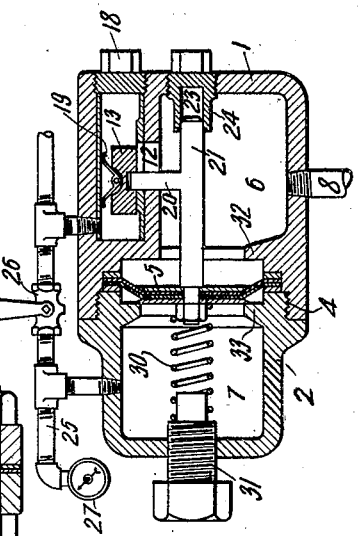

The valve comprises a suitable casing shown in the drawings as formed of two parts marked 1 and 2 respectively and suitably joined together, such as by the compression bolts 3 shown in Fig. 1, or the threaded connection 4, shown in Fig. 3. Between the two casing members is a suitable movable abutment, which may be a piston but which is shown as a diaphragm 5, for actuating the control valve, said diaphragm dividing the casing into two chambers, to-wit, a chamber 6 in the casing member 1 and a chamber 7 in the casing member 2. The chamber 6 has a connection 8 to the train pipe, and a valve controlled connection 9 with the main reservoir pipe 10. Between the main reservoir connection 10 and train pipe connection 8 is a partition 11 provided with a feed opening 12 controlled by valve 13, the latter being shown as a slide valve coöperating with seat 14 formed on a bushing 15 driven into a bore 16 in the casing member 1 and one wall of which forms the partition 11. The inner end of this bore is closed by the integral wall 17, while its outer end is closed by a plug 18. The slide valve 13 is held to its seat by spring 19, and said valve is engaged by a projection 20 extending through the feed opening 12 and forming a part of a stem 21 at one end secured to and actuated by the diaphragm 5, and at its other end guided in an opening 23 in a plug 24 threaded into the end wall of casing member 1. The slide valve 13 controls the opening 12 which forms the communication between the main reservoir connection 9 and train pipe connection 8.

The diaphragm 5 is subject at all times to train pipe pressure in chamber 6. Its opposite face is subject to a predetermined fixed pressure in the closed chamber 7. This pressure, preferably, is derived from the main reservoir through pipe 25 controlled by the three-way cut-off cock 26 and having connected thereto a suitable pressure gage 27. By means of the cock 26 any amount of pressure can be admitted to chamber 7, or released therefrom. The engineer will admit pressure to the chamber 7 until the gage 27 stands at the amount of pressure to be carried in the brake pipe. Whenever the brake pipe pressure falls below this amount, the diaphragm 5 moves to the left, carrying with it the slide valve 13 to open communication from the main reservoir to the train pipe, and as soon as the pressure in the train pipe and in chamber 6 balances the pressure in chamber 7, or very slightly exceeds the same, the diaphragm is moved to the right to cut off further communication between the main reservoir and the train pipe. The slide valve 13 will move upon a very slight unbalancing of pressures on the two faces of diaphragm 5, not to exceed one-half pound. Consequently, the pressure in the brake pipe is automatically kept at substantially the pressure indicated by the gage 27.

If desired, the air pressure in chamber 7 may be supplemented by a spring 30, as shown in Fig. 3, bearing against diaphragm 5 and arranged to be adjusted by screw 31. The strength of spring 30, preferably, will be equal to the minimum pressure to be carried in the train pipe, so that it will take care of the minimum pressure therein without additional fluid pressure in chamber 7. Any desired pressure, however, can be carried in the train pipe by merely admitting to chamber 7 an amount of pressure equal to the difference between the pressure to be carried by the train pipe and the strength of spring 30.

Suitable stops 32 and 33 in the casing are provided for limiting the movement of the diaphragm 5.

The feed valve described is very sensitive, the valve itself being a slide valve and, therefore, not affected by differences of pressure on opposite sides thereof. The engineer can absolutely control the pressure in the train pipe by merely admitting to chamber 7 fluid pressure until the gage 27 stands at the pressure to be carried in the train pipe. He can regulate the pressure in chamber 7 by the cock 26 and alter it from time to time as desired, by either admitting more fluid pressure thereto or releasing it therefrom. The friction of the valve on its seat is so slight that the diaphragm 5 moves the valve upon only slight unbalancing of pressures on the opposite faces of said diaphragm so that practically uniformity of pressure in the train pipe is assured.

What I claim is:—

1. A feed valve for air brakes comprising a casing having connections to the main reservoir and the train pipe, a valve seat in said casing having a port affording communication between the main reservoir and the train pipe connections, a slide valve coöperating with said seat and controlling said port, and a movable abutment controlling said valve and subject on one side to train pipe pressure and on its opposite side to a predetermined fixed pressure of a trapped body of air entirely independent of pressure variations in brake applications.

2. A feed valve for air brakes comprising a casing having connections to the main reservoir and the train pipe, a seat in said casing having a port affording communication between the train pipe and the main reservoir connections, a slide valve coöperating with said seat and controlling said port, a movable abutment controlling said valve and subject on one side to train pipe pressure and on its opposite side to pressure in a closed chamber arranged to be entirely independent of pressure variations in brake applications, and means arranged to admit pressure to and exhaust pressure from said chamber.

3. A feed valve for air brakes comprising a casing having connections to the main reservoir and the train pipe, a valve controlling communication between said connections, a movable abutment controlling said valve and subject on one side to train pipe pressure and on its opposite side to pressure in a closed chamber and arranged to be entirely independent of variations in pressure in brake applications, and means independent of the engineer's brake valve for admitting a predetermined pressure to said chamber.

4. A feed valve for air brakes comprising a casing having connections to the main reservoir and the train pipe, a valve controlling communication between said connections, a movable abutment controlling said valve and subject on one side to train pipe pressure and on its opposite side to pressure in a closed chamber arranged to be entirely independent of variations in pressure in brake applications, and manually operated connections from the main reservoir to said closed chamber for admitting a predetermined pressure into said chamber.

5. A feed valve for air brakes comprising a casing having connections to a source of pressure and the train pipe, a valve controlling communication between said connections, a movable abutment controlling said valve and subject on one side to train pipe pressure and on its opposite side to pressure in a closed chamber arranged to be entirely independent of pressure variations in brake applications, and a manually operated valve independent of the engineer's brake valve and arranged to admit pressure to and exhaust pressure from said chamber.

6. A feed valve for air brakes comprising a casing having connections to a source of pressure and the train pipe, a valve controlling communication between said connections, a movable abutment controlling said valve and subject on one side to train pipe pressure and on its opposite side to pressure in a closed chamber arranged to be entirely independent of pressure variations in brake applications, means independent of the engineer's brake valve for admitting pressure to said chamber, and means for indicating the degree of pressure in said chamber.

In testimony whereof I have hereunto set my hand.

JACOB RUSH SNYDER.

Witnesses:
F. W. MILLER,
WILLIAM B. WHARTON.

---

Copies of this patent may be obtained for five cents each, by addressing the "Commissioner of Patents, Washington, D. C."